United States Patent
Suzuki (10) Patent No.: US 10,641,945 B2
(45) Date of Patent: May 5, 2020

(54) OPTICAL FIBER MANUFACTURING APPARATUS AND METHOD OF STARTING OPTICAL FIBER MANUFACTURING APPARATUS

(71) Applicant: FURUKAWA ELECTRIC CO., LTD., Tokyo (JP)

(72) Inventor: Takashi Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/575,641

(22) Filed: Sep. 19, 2019

(65) Prior Publication Data

US 2020/0012038 A1 Jan. 9, 2020

Related U.S. Application Data

(63) Continuation of application No. PCT/JP2018/012017, filed on Mar. 26, 2018.

(30) Foreign Application Priority Data

Mar. 31, 2017 (JP) ................................ 2017-072608

(51) Int. Cl.
  *G02B 6/02* (2006.01)
  *B29D 11/00* (2006.01)
  *F21V 8/00* (2006.01)

(52) U.S. Cl.
  CPC ...... *G02B 6/0065* (2013.01); *B29D 11/00721* (2013.01); *G02B 6/02033* (2013.01); *G02B 6/02395* (2013.01)

(58) Field of Classification Search
  CPC .............. G02B 6/0065; G02B 6/02033; G02B 6/02395; B29D 11/00721
  See application file for complete search history.

(56) References Cited

U.S. PATENT DOCUMENTS

| 8,347,656 B2* | 1/2013 | Aoki ..................... C03B 37/035 65/435 |
| 9,389,361 B2* | 7/2016 | Matsushita ........ G02B 6/02395 |
| 2002/0066292 A1* | 6/2002 | Wang .................. C03B 37/0253 65/382 |

FOREIGN PATENT DOCUMENTS

| JP | 04-357139 A | 12/1992 |
| JP | 06-234553 A | 8/1994 |

(Continued)

OTHER PUBLICATIONS

International Search Report dated Jun. 26, 2018 in PCT/JP2018/012017 filed Mar. 26, 2018 (with English Translation).

(Continued)

*Primary Examiner* — Daniel Petkovsek
(74) *Attorney, Agent, or Firm* — Oblon, McClelland, Maier & Neustadt, L.L.P.

(57) ABSTRACT

An optical fiber manufacturing apparatus includes a heating furnace configured to heat and melt an optical fiber preform; a pulling mechanism configured to adjust an outer diameter of a glass optical fiber by drawing out the glass optical fiber from the optical fiber preform melted through the heating by the heating furnace, and to draw the glass optical fiber that has been adjusted in outer diameter; a coating mechanism configured to apply a predetermined resin on an outer circumference of the glass optical fiber that has been adjusted in outer diameter; and a transport mechanism configured to returnably retract the coating mechanism from a passage route of the glass optical fiber.

15 Claims, 5 Drawing Sheets

(56) References Cited

FOREIGN PATENT DOCUMENTS

| | | |
|---|---|---|
| JP | 10-330133 A | 12/1998 |
| JP | 2005-075664 A | 3/2005 |
| JP | 2005097051 A * | 4/2005 ........... C03B 37/032 |

OTHER PUBLICATIONS

Written Opinion dated Jun. 26, 2018 in PCT/JP2018/012017 filed Mar. 26, 2018.

* cited by examiner

OPTICAL FIBER MANUFACTURING APPARATUS AND METHOD OF STARTING OPTICAL FIBER MANUFACTURING APPARATUS

CROSS-REFERENCE TO RELATED APPLICATION(S)

This application is a continuation of International Application No. PCT/JP2018/012017, filed on Mar. 26, 2018 which claims the benefit of priority of the prior Japanese Patent Application No. 2017-072608, filed on Mar. 31, 2017, the entire contents of which are incorporated herein by reference.

BACKGROUND

The present disclosure relates to an optical fiber manufacturing apparatus and a start-up method of the same.

In an optical fiber manufacturing process, an optical fiber preform is heated and melted by a drawing furnace, so that a glass optical fiber is drawn therefrom. Then, a resin is applied onto an outer circumference of the glass optical fiber by a coating mechanism also called a die. Generally, this die has an insertion hole through which the glass optical fiber to be coated is inserted, and the die applies the resin onto an outer circumference of the glass optical fiber that passes through this insertion hole serially. The applied resin is cured by a curing mechanism arranged downstream from the die, and the glass optical fiber is thereby formed into an optical fiber (also called, a bare optical fiber) having a coating layer formed therearound.

The outer diameter of the glass optical fiber needs to be made smaller than the insertion hole of the die before this process of manufacturing the optical fiber, and thus when the manufacture of the optical fiber is started, the glass optical fiber is serially drawn out from the optical fiber preform such that the glass optical fiber is made thinner (see, for example, Japanese Laid-open Patent Publication No. H10-330133). Hereinafter, drawing out a glass optical fiber from an optical fiber preform for adjustment where the glass optical fiber is made thinner than the insertion hole of a die will be referred to as "pre-drawing", and will be distinguished from "drawing" where the glass optical fiber (the glass optical fiber to be coated), which has been adjusted in outer diameter such that the glass optical fiber is able to be inserted in the insertion hole of the die, is drawn out from the optical fiber preform.

SUMMARY

According to a first aspect of the present disclosure, an optical fiber manufacturing apparatus is provided which includes a heating furnace for heating and melting an optical fiber preform; a pulling mechanism for adjusting an outer diameter of a glass optical fiber by drawing out the glass optical fiber from the optical fiber preform melted through the heating by the heating furnace, and drawing the glass optical fiber that has been adjusted in outer diameter; a coating mechanism for applying a predetermined resin on an outer circumference of the glass optical fiber that has been adjusted in outer diameter; and a transport mechanism for returnably retracting the coating mechanism from a passage route of the glass optical fiber.

According to a second aspect of the present disclosure, a start-up method for an optical fiber manufacturing apparatus is provided. The optical fiber manufacturing apparatus is to thermally melt an optical fiber preform by a heating furnace; draw, by a pulling mechanism, a glass optical fiber having a desired outer diameter from the optical fiber preform; apply, by a coating mechanism, a predetermined resin on an outer circumference of the glass optical fiber that has been drawn; and manufacture an optical fiber having a coating layer formed on an outer circumference by curing of the predetermined resin. The start-up method for an optical fiber manufacturing apparatus includes retracting, by the pulling mechanism, the coating mechanism from a passage route of the glass optical fiber drawn out from the optical fiber preform; drawing out, by the pulling mechanism, the glass optical fiber from the optical fiber preform such that an outer diameter of the glass optical fiber is adjusted; and returning the coating mechanism onto a passage route of the glass optical fiber that has been adjusted in outer diameter.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Embodiments of an optical fiber manufacturing apparatus and a start-up method of the same according to the present disclosure are described in the following with reference to the drawings. The embodiments are not intended to limit the disclosure. The drawings are schematic illustrations, and it should be noted that the relation between the sizes of the components and the ratio between the components may possibly be different from those in an actual configuration. The relation between the sizes and the ratio may possibly be different between the drawings. Additionally, in each of the drawings, like reference symbols are given to like or corresponding components.

Configuration of Optical Fiber Manufacturing Apparatus

Figure 1:
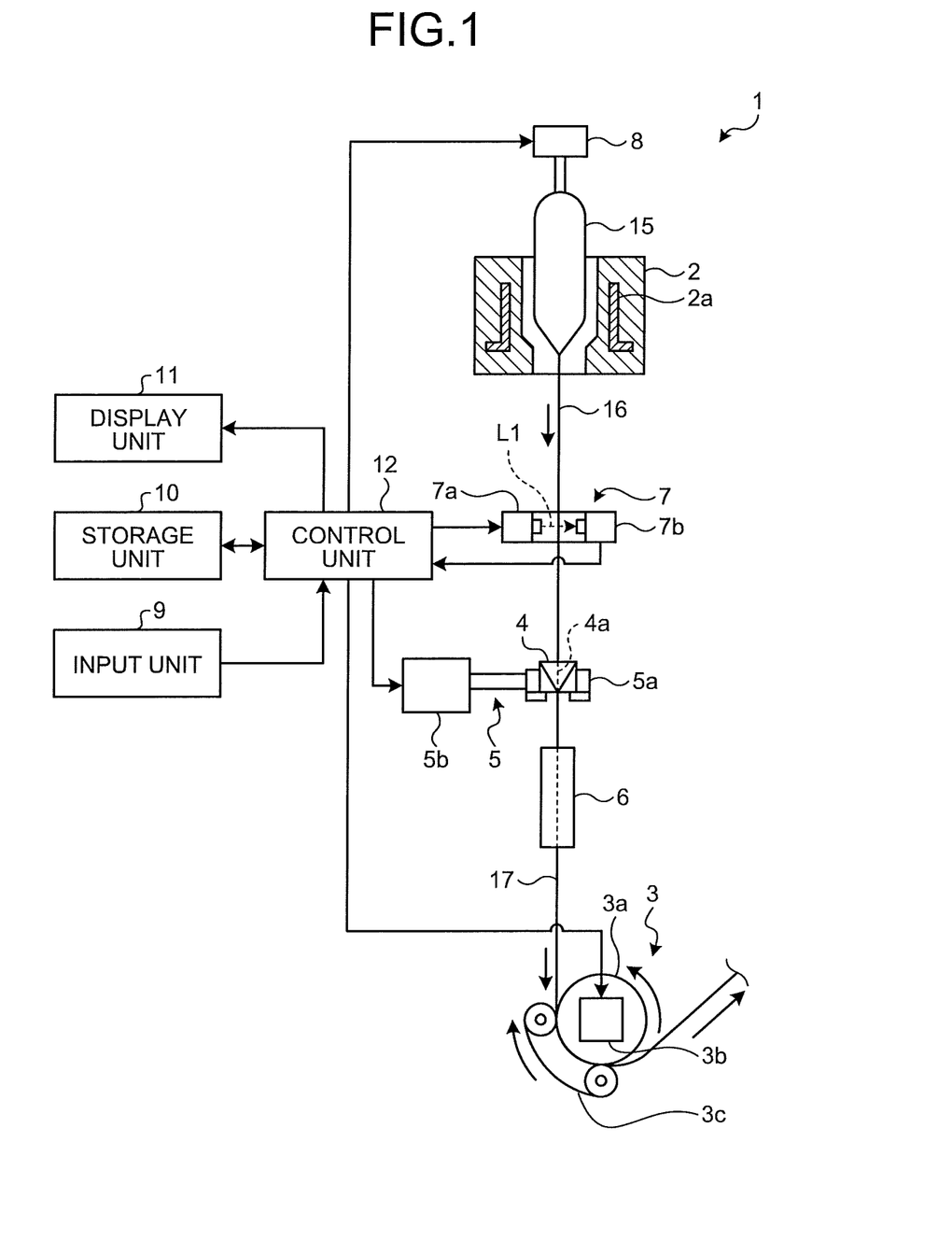
FIG. 1 is a schematic diagram illustrating an example of a configuration of an optical fiber manufacturing apparatus according to an embodiment of the present disclosure.

First, explanation will be made about a configuration of an optical fiber manufacturing apparatus according to an embodiment of the present disclosure. FIG. 1 is a schematic diagram illustrating an example of the configuration of the optical fiber manufacturing apparatus according to the embodiment of the present disclosure. As illustrated in FIG. 1, this optical fiber manufacturing apparatus 1 includes a drawing furnace 2, a pulling mechanism 3, a die 4, a transport mechanism 5, a curing mechanism 6, a measuring device 7, a holding mechanism 8, an input unit 9, a storage unit 10, a display unit 11, and a control unit 12.

The drawing furnace 2 is a heating furnace that melts an optical fiber preform 15 serving as a target, from which a glass optical fiber 16 is drawn out (drawn or pre-drawn) by heating the optical fiber preform 15. As illustrated in FIG. 1, the drawing furnace 2 has a heater 2a, and is arranged above the pulling mechanism 3, the curing mechanism 6, the die 4, and the measuring device 7. The drawing furnace 2 heats the optical fiber preform 15, which has been set in the furnace, over its outer periphery by means of the heater 2a. The drawing furnace 2 thereby melts the optical fiber preform 15 to be in a state where drawing or pre-drawing of the glass optical fiber 16 is possible.

The pulling mechanism 3 has both a function of drawing or pre-drawing the glass optical fiber 16 from the optical fiber preform 15, and a function of sending out an optical fiber 17 toward a winder (not illustrated in the drawings), such as a bobbin, the optical fiber 17 having a coating layer formed around the glass optical fiber 16. As illustrated in FIG. 1, the pulling mechanism 3 is arranged below the drawing furnace 2. According to this embodiment, the measuring device 7, the die 4, and the curing mechanism 6 are arranged in this order from an upper side to a lower side, between the drawing furnace 2 thereabove and the pulling mechanism 3 therebelow. The pulling mechanism 3 is arranged immediately below the curing mechanism 6.

Furthermore, the pulling mechanism 3 has a capstan 3a, a drive unit 3b, and an endless belt 3c that is freely rotatable. The capstan 3a is configured to be rotated by drive force provided from the drive unit 3b. The endless belt 3c is configured to be freely rotatably pushed against a part of an outer peripheral surface of the capstan 3a, the part being where the glass optical fiber 16 or the optical fiber 17 is wound around, and to rotate, in association with the rotation of the capstan 3a, in a direction opposite to that by the capstan 3a.

According to this embodiment, the pulling mechanism 3 pulls the glass optical fiber 16 or the optical fiber 17 toward the winder from the optical fiber preform 15, by the drive force of the drive unit 3b causing the capstan 3a and the endless belt 3c to rotate while the glass optical fiber 16 or the optical fiber 17 is sandwiched between the capstan 3a and the endless belt 3c. When the optical fiber manufacturing apparatus 1 is started, the pulling mechanism 3 thereby performs pre-drawing for adjustment of the outer diameter of the glass optical fiber 16 by drawing out the glass optical fiber 16 from the optical fiber preform 15 melted through the heating by the drawing furnace 2, that is, for outer diameter adjustment where the glass optical fiber 16 is made thinner. The pulling mechanism 3 also draws the glass optical fiber 16 that has been adjusted in outer diameter, from the optical fiber preform 15. Furthermore, after starting of the optical fiber manufacturing apparatus 1 has been completed, the pulling mechanism 3 draws the glass optical fiber 16 that has been adjusted in outer diameter from the optical fiber preform 15, and sends out the optical fiber 17 toward the winder while pulling the optical fiber 17 from the optical fiber preform 15.

The die 4 functions as a coating mechanism that applies a predetermined resin for coating around the glass optical fiber 16. As illustrated in FIG. 1, the die 4 has an insertion hole 4a where the glass optical fiber 16, which has been adjusted in outer diameter through the above described pre-drawing, is inserted through, and the die 4 is arranged between the drawing furnace 2 thereabove and the pulling mechanism 3 therebelow (more particularly, between the measuring device 7 thereabove and the curing mechanism 6 therebelow). The die 4 further has a supply route, which is not particularly illustrated in FIG. 1 and is for the predetermined resin for coating, and this supply route communicates with the insertion hole 4a. The die 4 applies the predetermined resin for coating, around the glass optical fiber 16, which has been inserted in the insertion hole 4a toward the pulling mechanism 3 therebelow from the drawing furnace 2 thereabove and has been adjusted in outer diameter. The predetermined resin for coating according to the embodiment may be, for example, a photocurable resin that is cured by irradiation with light of a predetermined wavelength band, such as an ultraviolet curing resin.

The transport mechanism 5 returnably retracts the die 4 from a passage route of the glass optical fiber 16 adjusted in outer diameter by the pulling mechanism 3. As illustrated in FIG. 1, the transport mechanism 5 has a supporting unit 5a and a drive unit 5b. The supporting unit 5a has the die 4 fixed therein with the opening of the insertion hole 4a not closed, and supports the fixed die 4 such that, for example, the passage route of the glass optical fiber 16 and the insertion hole 4a become parallel to each other. The drive unit 5b is connected to the supporting unit 5a via a drive shaft or the like, and transports the supporting unit 5a having the die 4 fixed therein, in a direction away from or a direction closer to the passage route of the glass optical fiber 16. Before the outer diameter of the glass optical fiber 16 is adjusted by the pulling mechanism 3, the transport mechanism 5 retracts the die 4, together with the supporting unit 5a, from the passage route of the glass optical fiber 16, by means of action of the drive unit 5b. Furthermore, after the outer diameter of the glass optical fiber 16 has been adjusted by the pulling mechanism 3, the transport mechanism 5 returns the die 4, together with the supporting unit 5a, onto the passage route of the glass optical fiber 16 that has been adjusted in outer diameter, by means of action of the drive unit 5b. The transport mechanism 5 thereby aligns the position of the passage route of the glass optical fiber 16 that has been adjusted in outer diameter, with the position of the insertion hole 4a of the die 4.

The drive unit 5b of the transport mechanism 5 may perform the driving pneumatically, hydraulically, or electrically, for example, but for better responsiveness, pneumatic or hydraulic driving is preferable. Furthermore, from a viewpoint of avoidance of adhesion of oil components to the glass optical fiber 16 or the optical fiber 17, pneumatic driving is more preferable.

The curing mechanism 6 cures the predetermined resin for coating (hereinafter, abbreviated as the coating resin, as appropriate) that has been applied around the glass optical fiber 16 by the die 4. The curing mechanism 6 is formed of, for example, an ultraviolet irradiation device, and is arranged, as illustrated in FIG. 1, between the die 4 thereabove and the pulling mechanism 3 therebelow. The curing mechanism 6 irradiates the glass optical fiber 16 travelling toward the pulling mechanism 3 from the die 4 (that is, the glass optical fiber 16 having the coating resin applied therearound by the die 4) with the light of the predetermined wavelength band, such as ultraviolet light, and the curing mechanism 6 thereby cures the coating resin around the glass optical fiber 16 and forms the coating layer therearound. As a result, the glass optical fiber 16 is formed into the optical fiber 17 (a bare optical fiber) having the coating layer therearound. While being pulled by the pulling mechanism 3, the optical fiber 17 travels toward the winder via the pulling mechanism 3 from the curing mechanism 6, and is thereafter wound up by the winder. The curing mechanism 6 may be a heater or the like as necessary, or a combination of an ultraviolet irradiation device and a heater or the like.

A method of forming the coating layer around the glass optical fiber 16 that has been adjusted in outer diameter may be, for example, the wet-on-wet (WOW) method, or the wet-on-dry (WOD) method. The WOW method is a method where plural layers of photocurable resin (ultraviolet curable resin according to this embodiment) are applied around the glass optical fiber 16 by the die 4, and the plural layers of photocurable resin are cured together through photoirradiation of one time (ultraviolet irradiation according to the embodiment) by the curing mechanism 6. The WOD method is a method where plural pairs of dies 4 and curing mechanisms 6 are arranged in plural stages and coating layers are formed one by one by the dies 4 and curing mechanisms 6 of these stages. In either the WOW method or the WOD method, at least two coating layers, an inner primary layer and an outer secondary layer, are formed around the glass optical fiber 16. In this embodiment, the optical fiber manufacturing apparatus 1 having, applied thereto, a device configuration with the die 4 and the curing mechanism 6 for coating two layers collectively by the WOW method is described as an example.

The measuring device 7 measures an outer diameter and a passage position of the glass optical fiber 16. As illustrated in FIG. 1, the measuring device 7 has a light source unit 7a and a light receiving unit 7b, and is arranged between the drawing furnace 2 thereabove and the die 4 therebelow. The light source unit 7a emits predetermined light L1 (for example, planar light) to the glass optical fiber 16 traveling from the drawing furnace 2 toward the die 4. The light receiving unit 7b receives the light L1 emitted from the light source unit 7a. This received light L1 includes light transmitted through the glass optical fiber 16. Based on received light intensity or the like of the light L1 transmitted and received between the light source unit 7a and the light receiving unit 7b via the glass optical fiber 16, the measuring device 7 measures both the outer diameter and passage position of the glass optical fiber 16. In particular, according to the embodiment, the measuring device 7 measures the outer diameter of the glass optical fiber 16 adjusted by the pulling mechanism 3, and further measures the passage position of the glass optical fiber 16 that has been adjusted in outer diameter. The measuring device 7 transmits acquired results of measurement of an outer diameter and a passage position, to the control unit 12, every time the outer diameter and the passage position of the glass optical fiber 16 are measured as described above.

The holding mechanism 8 holds the optical fiber preform 15 and adjusts relative position of the optical fiber preform 15 to the drawing furnace 2. As illustrated in FIG. 1, the holding mechanism 8 holds the optical fiber preform 15 set in the drawing furnace 2, from thereabove. The holding mechanism 8 lowers or raises the optical fiber preform 15 thus held, in a longitudinal direction thereof, and thereby adjusts the relative position of the optical fiber preform 15 (particularly its lower end position) to the heater 2a of the drawing furnace 2.

The input unit 9 is formed of an input device, such as a keyboard, a mouse, or the like, and inputs desired information to the control unit 12 according to input operation by an operator. The information input by the input unit 9 may be, for example, instruction information for instructing start-up or start of an operation of the optical fiber manufacturing apparatus 1, outer diameter reference value information indicating a reference value of the outer diameter of the glass optical fiber 16, or manufacturing condition information indicating manufacturing conditions (a target value of the outer diameter and the like) for the optical fiber 17.

The storage unit 10 is formed of: a non-volatile storage device, such as a hard disk drive, which stores therein various types of information updatably; or the like. The storage unit 10 stores therein information instructed by the control unit 12 to be stored therein, reads information instructed by the control unit 12 to be read from the stored information, and transmits the read information to the control unit 12. The information stored by the storage unit 10 may be, for example, information input by the input unit 9, or measurement information representing results of measurement of the outer diameter and passage position of the glass optical fiber 16 by the measuring device 7.

The display unit 11 is formed of a display device, such as a liquid crystal display. The display unit 11 displays thereon information instructed by the control unit 12 to be displayed thereon. The information displayed by the display unit 11 may be, for example, information input by the input unit 9, information measured by the measuring device 7, or information indicating a start-up state or an operation state of the optical fiber manufacturing apparatus 1.

The control unit 12 is formed of: a CPU that executes a preset program; a ROM that stores therein various types of information, such as a program; a RAM that temporarily stores therein information, such as arithmetic operation parameters; and the like. The control unit 12 controls components of the optical fiber manufacturing apparatus 1, such as, the drive unit 3b of the pulling mechanism 3, the drive unit 5b of the transport mechanism 5, the measuring device 7, the holding mechanism 8, the storage unit 10, and the display unit 11, and controls input and output of signals among the measuring device 7, the input unit 9, and the storage unit 10.

For example, according to the embodiment, by controlling the drive unit 3b of the capstan 3a, the control unit 12 controls draw-out (pre-drawing or drawing) of the glass optical fiber 16 from the optical fiber preform 15 by means of the pulling mechanism 3. In particular, the control unit 12 controls the pulling mechanism 3, based on the outer diameter of the glass optical fiber 16 measured by the measuring device 7. Specifically, if the outer diameter of the glass optical fiber 16 measured by the measuring device 7 is less than the diameter of the insertion hole 4a of the die 4, the control unit 12 controls the pulling mechanism 3 so as to stop draw-out (pre-drawing) of the glass optical fiber 16 from the optical fiber preform 15. Furthermore, by controlling the drive unit 5b of the transport mechanism 5, the control unit 12 controls retraction operation and after-retraction return operation of the die 4 by the transport mechanism 5. In this control, the control unit 12 controls the return position of the die 4, based on the passage position of the glass optical fiber 16 that has been adjusted in outer diameter, the passage position having been measured by the measuring device 7. Moreover, the control unit 12 controls operation of the holding mechanism 8 that brings the optical fiber preform 15, which has been set in the drawing furnace 2, close to or away from the heater 2a of the drawing furnace 2. In particular, after stopping pre-drawing of the glass optical fiber 16, the control unit 12 controls the holding mechanism 8 to separate the optical fiber preform 15 in the drawing furnace 2, from the heater 2a of the drawing furnace 2.

Start-Up Method of Optical Fiber Manufacturing Apparatus

Figure 2:
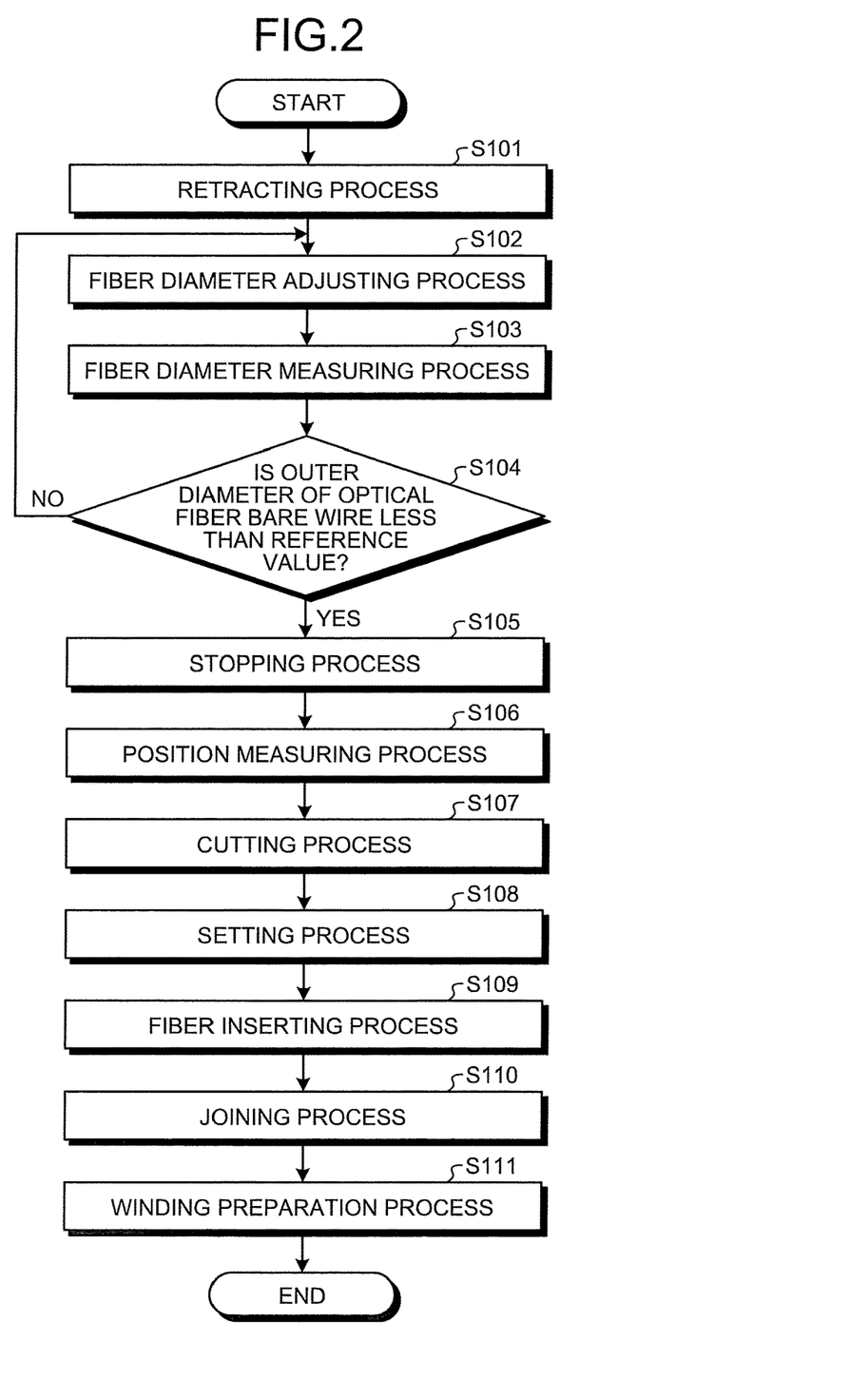
FIG. 2 is a flow chart illustrating an example of a method of starting the optical fiber manufacturing apparatus according to the embodiment of the present disclosure.
Figure 3:
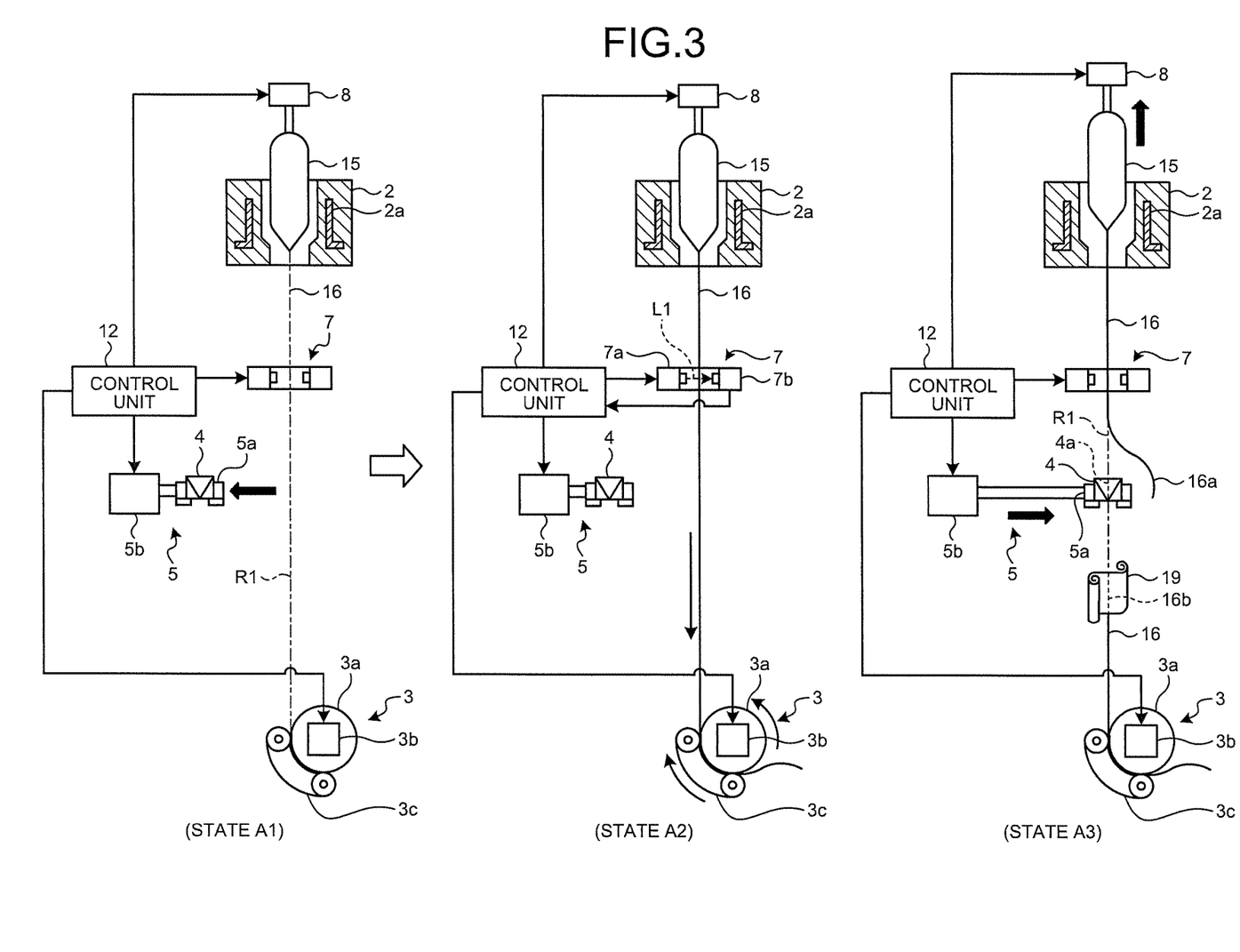
FIG. 3 is a schematic diagram illustrating processes from a die retracting process to a die setting process in the method of starting the optical fiber manufacturing apparatus.
Figure 4:
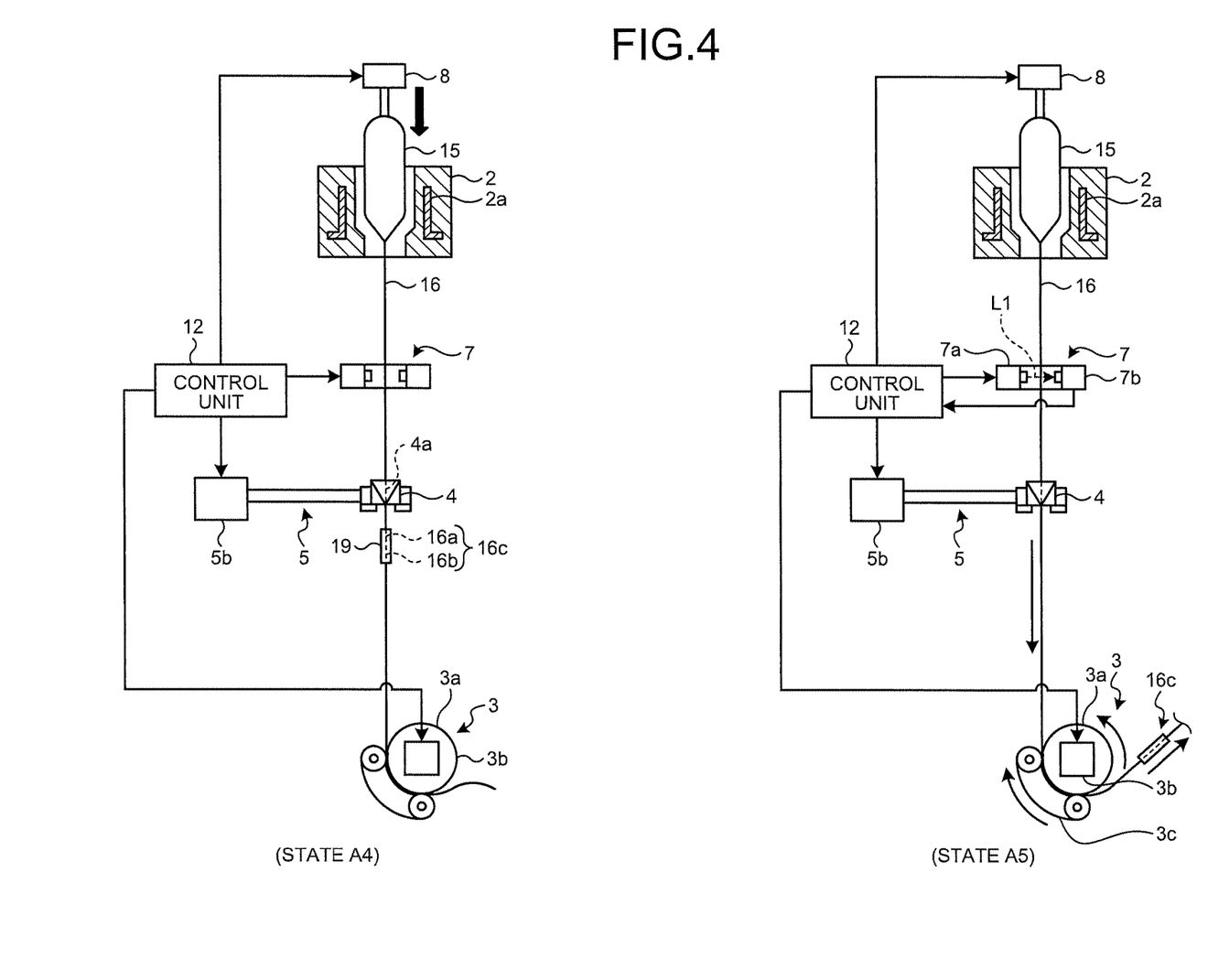
FIG. 4 is a schematic diagram illustrating processes from a fiber inserting process for a die and an optical fiber winding preparation process, in the method of starting the optical fiber manufacturing apparatus.

Next, explanation is made about a start-up method of the optical fiber manufacturing apparatus 1 according to the embodiment of the present disclosure. FIG. 2 is a flow chart illustrating an example of the method of starting the optical fiber manufacturing apparatus according to the embodiment of the present disclosure. FIG. 3 is a schematic diagram illustrating processes from a die retracting process to a die setting process in the method of starting the optical fiber manufacturing apparatus. FIG. 4 is a schematic diagram illustrating processes from a fiber inserting process for the die and an optical fiber winding preparation process, in the method of starting the optical fiber manufacturing apparatus. For facilitation of explanation of each process, illustration of the curing mechanism 6, the input unit 9, the storage unit 10, and the display unit 11 is omitted in FIG. 3 and FIG. 4.

As illustrated in FIG. 1, in the optical fiber manufacturing apparatus 1: the optical fiber preform 15 is melted through heating by the drawing furnace 2; the glass optical fiber 16 having a desired outer diameter is drawn from this optical fiber preform 15 by the pulling mechanism 3 arranged below the drawing furnace 2; the coating resin is applied on an outer circumferential of the glass optical fiber 16, which heads toward the pulling mechanism 3 at the lower side from the drawing furnace 2 at the upper side and has been inserted through the insertion hole 4a, by the die 4 having the insertion hole 4a where the drawn glass optical fiber 16 is inserted through; and the optical fiber 17 having the coating layer formed therearound through curing of the coating resin by the curing mechanism 6 is manufactured. In this start-up method of the optical fiber manufacturing apparatus 1, processes of Steps S101 to S11 illustrated in FIG. 2 are performed.

More particularly, as illustrated in FIG. 2, in the method of starting the optical fiber manufacturing apparatus 1, a retracting process is first performed where the die 4 is retracted from the passage route of the glass optical fiber 16 drawn out from the optical fiber preform 15 by the pulling mechanism 3 (Step S101).

At Step S101, like in a state A1 illustrated in FIG. 3, the optical fiber preform 15 is set in the drawing furnace 2, in a state of being held by the holding mechanism 8. The drawing furnace 2 heats and melts the set optical fiber preform 15. Before the glass optical fiber 16 is drawn out from the optical fiber preform 15 melted through the heating, the control unit 12 transmits a control signal for instructing retraction of the die 4, to the drive unit 5b of the transport mechanism 5. Based on this control signal, the transport mechanism 5 operates the drive unit 5b and causes the die 4 to retract, together with the supporting unit 5a, from an optical fiber passage route R1. According to the embodiment, the optical fiber passage route R1 is the passage route of the glass optical fiber 16 drawn out from the optical fiber preform 15 until the outer diameter has been adjusted to be smaller than the insertion hole 4a (see FIG. 1) of the die 4, that is, the passage route of the glass optical fiber 16 pre-drawn from the optical fiber preform 15 by the pulling mechanism 3.

After the die 4 has been retracted from the optical fiber passage route R1, the glass optical fiber 16 is drawn out from the optical fiber preform 15, and is sufficiently drawn out to the position of the pulling mechanism 3 along the optical fiber passage route R1 by, for example, being attached with a weight. Thereafter, the glass optical fiber 16 is wound around between the capstan 3a and the endless belt 3c. At this time, the drive unit 3b of the pulling mechanism 3 has been stopped based on control by the control unit 12. Based on control by the control unit 12, the measuring device 7 is in a state of not performing measurement. The holding mechanism 8, on the other hand, is adjusting, based on control by the control unit 12, relative position of a lower end portion of the optical fiber preform 15 to the heater 2a of the drawing furnace 2, so as to enable the glass optical fiber 16 to be drawn out.

After the above described retracting process has been performed, a fiber diameter adjusting process is performed (Step S102) where the glass optical fiber 16 is drawn out from the optical fiber preform 15 by the pulling mechanism 3 and the outer diameter of the glass optical fiber 16 is adjusted. At Step S102, like in a state A2 illustrated in FIG. 3, based on control by the control unit 12, the pulling mechanism 3 drives the drive unit 3b and causes the capstan 3a and the endless belt 3c in a state of sandwiching the glass optical fiber 16 to rotate. The pulling mechanism 3 thereby performs pre-drawing of the glass optical fiber 16 from the optical fiber preform 15. By serially performing this pre-drawing of the glass optical fiber 16 at a pre-drawing speed instructed by the control unit 12, the pulling mechanism 3 adjusts the outer diameter of the glass optical fiber 16 so as to make the glass optical fiber 16 thinner. In the adjustment, the holding mechanism 8 is continuously adjusting the above described relative position of the lower end portion of the optical fiber preform 15 to the heater 2a of the drawing furnace 2, based on control by the control unit 12. The transport mechanism 5 maintains, based on control of the drive unit 5b by the control unit 12, the state where the die 4 has been retracted from the passage route (the optical fiber passage route R1 illustrated in the state A1) of the glass optical fiber 16 being pre-drawn.

Subsequently, a fiber diameter measuring process is performed (Step S103) where the outer diameter of the glass optical fiber 16 adjusted by the pulling mechanism 3 is measured. At Step S103, like in a state A2 illustrated in FIG. 3, the measuring device 7 measures, based on control by the control unit 12, the outer diameter of the glass optical fiber 16 being pre-drawn by the pulling mechanism 3. In this measurement, the light source unit 7a emits the light L1 having an intensity instructed by the control unit 12. The light receiving unit 7b receives the light L1 from the light source unit 7a via the glass optical fiber 16 being pre-drawn. Based on the received light intensity or the like of the light L1 transmitted and received between the light source unit 7a and the light receiving unit 7b as described above, the measuring device 7 measures, together with a passage position of the glass optical fiber 16 being pre-drawn, the outer diameter of the glass optical fiber 16 being pre-drawn. The measuring device 7 transmits results of the measurement of the outer diameter and passage position of the glass optical fiber 16 thus acquired, to the control unit 12.

Subsequently, a determining process is performed (Step S104) where it is determined whether or not the measured outer diameter of the glass optical fiber 16 is less than the diameter of the insertion hole 4a (see FIG. 1) of the die 4. At Step S104, the control unit 12 acquires a measured value of the outer diameter of the glass optical fiber 16 from the measuring device 7. Furthermore, the control unit 12 reads the outer diameter reference value information from the storage unit 10 (see FIG. 1), and acquires a reference value for the outer diameter of the glass optical fiber 16, the reference value being indicated by the outer reference value information read. According to the embodiment, the diameter (inner diameter) of the insertion hole 4a of the die 4 is set, for example, as this reference value. The control unit 12 compares the acquired measured value for the outer diameter of the glass optical fiber 16 with the reference value, and determines whether or not the measured value for the outer diameter is less than the reference value, that is, whether or not the measured value is less than the diameter of the insertion hole 4a.

If the measured value for the outer diameter is equal to or greater than the reference value, the control unit 12 determines that the outer diameter of the glass optical fiber 16 being pre-drawn is not less than the reference value (=the diameter of the insertion hole 4a) (Step S104, No). In this case, as illustrated in FIG. 2, the method is returned to the above described fiber diameter adjusting process of Step S102, and the processes from this fiber diameter adjusting process and thereafter are repeatedly performed.

On the contrary, if the measured value for the outer diameter is less than the reference value, the control unit 12 determines that the outer diameter of the glass optical fiber 16 being pre-drawn is less than the reference value (=the diameter of the insertion hole 4a) (Step S104, Yes). As described above, if the measured outer diameter of the glass optical fiber 16 is less than the diameter of the insertion hole 4a, a stopping process is performed (Step S105) where draw-out of the glass optical fiber 16 by means of the pulling mechanism 3 is stopped. At this Step S105, the control unit 12 controls the drive unit 3b of the pulling mechanism 3 to be stopped, and controls, through this control, the pulling mechanism 3 to stop pre-drawing of the glass optical fiber 16 from the optical fiber preform 15. The capstan 3a and the endless belt 3c thereby stop rotating in a state of sandwiching the glass optical fiber 16, in cooperation with each other. As a result, the adjustment of the outer diameter of the glass optical fiber 16 by pre-drawing from the optical fiber preform 15 is ended.

After the above described stopping process has been performed, a position measuring process is performed (Step S106) where a passage position of the glass optical fiber 16 that has been adjusted in outer diameter by the pulling mechanism 3 is measured. At Step S106, the measuring device 7 measures, based on control by the control unit 12, a passage position of the glass optical fiber 16 that has been adjusted in outer diameter. In this measurement, similarly to Step S103 described above, the light source unit 7a and the light receiving unit 7b transmit and receive the light L1 having the intensity instructed by the control unit 12, via the glass optical fiber 16 that has been adjusted in outer diameter. Based on the received light intensity or the like of the light L1 transmitted and received between the light source unit 7a and the light receiving unit 7b as described above, the measuring device 7 measures, together with the outer diameter, the passage position of the glass optical fiber 16 that has been adjusted in outer diameter. The measuring device 7 transmits results of the measurement of the passage position and outer diameter of the glass optical fiber 16 acquired as described above, to the control unit 12.

After the above described position measuring process has been performed, a cutting process is performed (Step S107) where the glass optical fiber 16, which has been adjusted in outer diameter and is in a state where pre-drawing from the optical fiber preform 15 has been stopped through Step S105, is cut. At Step S107, based on the fact that: the measured outer diameter of the glass optical fiber 16 is less than the diameter of the insertion hole 4a; the state where pre-drawing of the glass optical fiber 16 has been stopped has been reached; and measurement of the passage position of the glass optical fiber 16 that has been adjusted in outer diameter has been completed, the control unit 12 controls the display unit 11 (see FIG. 1) to display thereon information prompting cutting of the glass optical fiber 16. Based on the information displayed on the display unit 11, the glass optical fiber 16 that has been adjusted in outer diameter is cut at, for example, a portion lower than a height direction (the longitudinal direction of the glass optical fiber 16) position of the die 4 in a retracted state by a predetermined cutting device or tool. Like in a state A3 illustrated in FIG. 3, the glass optical fiber 16 that has been adjusted in outer diameter is thereby divided into the upper glass optical fiber 16 joined to the optical fiber preform 15, and the lower glass optical fiber 16 sandwiched in the pulling mechanism 3. The outer diameter of the glass optical fiber 16 cut in this cutting process has been adjusted to be sufficiently thin (for example, to 0.2 mm or less), and is thus easy to be cut, and breakage scraps are difficult to be generated when the glass optical fiber 16 is cut.

After the glass optical fiber 16 that has been adjusted in outer diameter is cut as described above, the relative position of the optical fiber preform 15 to the drawing furnace 2 is adjusted such that the optical fiber preform 15 is kept away from the heater 2a of the drawing furnace 2. In this adjustment, the input unit 9 (see FIG. 1) inputs, according to input operation by an operator, information indicating completion of cutting of the glass optical fiber 16, to the control unit 12. Based on this information input by the input unit 9, the control unit 12 transmits a control signal for instructing keeping the optical fiber preform 15 away from the drawing furnace 2, to the holding mechanism 8. Based on this control signal, the holding mechanism 8 raises the optical fiber preform 15 along its longitudinal direction (that is, the longitudinal direction of the glass optical fiber 16). The relative position of the optical fiber preform 15 to the drawing furnace 2 is thereby adjusted such that the optical fiber preform 15 (in particular, its lower end portion) is kept away from the heater 2a of the drawing furnace 2. As a result, further melting by heating of the optical fiber preform 15 is able to be prevented. On the other hand, as to the lower glass optical fiber 16, a joining member 19, such as adhesive tape, is attached to a cut end portion 16b thereof, which is thereby temporarily held at, for example, a desired position above the pulling mechanism 3.

Subsequently, a setting process is performed (Step S108) where the die 4 is returned onto the passage route of the glass optical fiber 16 that has been adjusted in outer diameter. At Step S108, based on the above described information on completion of cutting of the glass optical fiber 16, after the glass optical fiber 16 that has been adjusted in outer diameter is cut, the control unit 12 controls the transport mechanism 5 to return the die 4 onto the passage route of the glass optical fiber 16 that has been adjusted in outer diameter. In this control, the control unit 12 reads and acquires the passage position of the glass optical fiber 16 that has been adjusted in outer diameter from the storage unit 10 (see FIG. 1), the passage position having been measured by the measuring device 7 at Step S106 described above. Subsequently, based on the above described information on completion of cutting of the glass optical fiber 16, the control unit 12 transmits a control signal for instructing return of the die 4 to this passage position of the glass optical fiber 16. Based on this control signal, the transport mechanism 5 causes the drive unit 5b to operate; like in the state A3 illustrated in FIG. 3, thereby causes the die 4 to return, together with the supporting unit 5a, from the retracted position, onto the optical fiber passage route R1; and aligns the position of the insertion hole 4a of the die 4 with the position of the optical fiber passage route R1. A cut end portion 16a of the upper glass optical fiber 16 is in a state of being retracted to a predetermined position beforehand so as not to come into contact with the returning die 4.

The optical fiber passage route R1 is, as described above, the passage route of the glass optical fiber 16 being pre-drawn. When being drawn by the pulling mechanism 3 from the optical fiber preform 15, the glass optical fiber 16 that has been adjusted in outer diameter travels along this optical fiber passage route R1. This optical fiber passage route R1 coincides with the passage position of the glass optical fiber 16 that has been adjusted in outer diameter, the passage position having been measured by the measuring device 7 through the above described position measuring process (Step S106). That is, based on the passage position of the glass optical fiber 16 that has been adjusted in outer diameter, the passage position having been measured by the measuring device 7, a return position of the die 4 in the above described setting process is controlled by the control unit 12 such that the insertion hole 4a of the die 4 and the optical fiber passage route R1 coincide with each other highly accurately. "The insertion hole 4a and the optical fiber passage route R1 coinciding with each other" means that the position of the central axis of the insertion hole 4a and the position of the optical fiber passage route R1 coincide with each other.

After the above described setting process has been performed, a fiber inserting process is performed (Step S109) where the glass optical fiber 16 that has been adjusted in outer diameter is inserted into the insertion hole 4a of the die 4 that has been returned onto the optical fiber passage route R1. At Step S109, the upper glass optical fiber 16 is held by a clamping device, a tool, or the like, and is inserted, like in a state A4 illustrated in FIG. 4, into the insertion hole 4a of the die 4 that has returned, in a direction heading from the upper side to the lower side. The outer diameter of the upper glass optical fiber 16 is adjusted to be sufficiently thin (for example, to 0.2 mm or less) as described above, and is thus difficult to be broken even if the upper glass optical fiber 16 is curved when the upper glass optical fiber 16 is inserted into the insertion hole 4a. The cut end portion 16a of this upper glass optical fiber 16 extends out from the die 4 to the lower side through the insertion hole 4a without being broken.

Furthermore, at Step S109, based on the fact that the transport mechanism 5 has been instructed to return the die 4 as described above, the control unit 12 transmits a control signal for instructing approach of the optical fiber preform 15 to the drawing furnace 2, to the holding mechanism 8. Based on this control signal, the holding mechanism 8 lowers the optical fiber preform 15 along the longitudinal direction of the glass optical fiber 16, and thereby causes the optical fiber preform 15 (in particular, its lower end portion) to approach the heater 2a of the drawing furnace 2. As a result, restraint on the melting of the optical fiber preform 15 by the heating is canceled.

After the above described fiber inserting process has been performed, a joining process is performed where the upper glass optical fiber 16 that has been inserted into the insertion hole 4a of the die 4 is joined together with the lower glass optical fiber 16 that has been sandwiched between the capstan 3a and the endless belt 3c of the pulling mechanism 3 (Step S110). Like in the state A4 illustrated in FIG. 4, at Step S110, the cut end portion 16a of the upper glass optical fiber 16 that has extended out from the insertion hole 4a to the lower side of the die 4 through the above described fiber inserting process, and the cut end portion 16b of the lower glass optical fiber 16 that has extended out toward the die 4 from the entry side of the pulling mechanism 3 are joined together by the joining member 19. A joint portion 16c between the cut end portions 16a and 16b via this joining member 19 is positioned below the die 4, and thus is not inserted into the insertion hole 4a of the die 4 and does not hinder the insertion of the glass optical fiber 16 into the insertion hole 4a.

In each of the above described processes of Steps S106 to S110, based on control of the drive unit 3b by the control unit 12, the pulling mechanism 3 has stopped rotation of the capstan 3a and endless belt 3c. Furthermore, in each of the above described processes of Steps S107 to S110, based on control by the control unit 12, the measuring device 7 has stopped measurement of the outer diameter and passage position of the glass optical fiber 16 (see the state A3 in FIG. 3 and the state A4 in FIG. 4).

After the above described joining process has been performed, a winding preparation process is performed (Step S111) where preparation is made for winding of an optical fiber to be manufactured (the optical fiber 17 illustrated in FIG. 1 according to the embodiment). At Step S111, the pulling mechanism 3, the transport mechanism 5, the measuring device 7, and the holding mechanism 8 are controlled by the control unit 12 as appropriate, and the optical fiber to be manufactured is thereby enabled to be wound up by the winder (not illustrated in the drawings) downstream from the pulling mechanism 3.

At this Step S111, the input unit 9 (see FIG. 1) inputs, according to input operation by an operator, information indicating completion of joining of the glass optical fiber 16, to the control unit 12. Based on this information input by the input unit 9, the control unit 12 transmits a control signal for instructing drawing of the glass optical fiber 16 from the optical fiber preform 15, to the drive unit 3b of the pulling mechanism 3. By means of drive force of the drive unit 3b based on this control signal, the pulling mechanism 3 rotates the capstan 3a and the endless belt 3c. Like in a state A5 illustrated in FIG. 4, the pulling mechanism 3 thereby draws the glass optical fiber 16 from the optical fiber preform 15 that has been melted by the heating, and pulls the joint portion 16c of this glass optical fiber 16. As a result, the joint portion 16c is sent out to the exit side of the pulling mechanism 3. The joint portion 16c is thereafter cut and removed.

Furthermore, the die 4 applies the coating resin on an outer circumference of the drawn glass optical fiber 16. The curing mechanism 6 (see FIG. 1) downstream from the die 4 forms the optical fiber 17 by forming the coating layer around this glass optical fiber 16 by curing the coating resin through irradiation of the coating resin with light. The optical fiber 17 formed is pulled by the pulling mechanism 3, and is sent out to the exit side of the pulling mechanism 3 subsequently to the joint portion 16c. While continuing the drawing of the glass optical fiber 16 from the optical fiber preform 15, the pulling mechanism 3 serially pulls the optical fiber 17 and sends a distal end portion of the optical fiber 17 out to the winder downstream therefrom. Thereafter, the distal end portion of the optical fiber 17 is wound around the winder. A state where drawing of the glass optical fiber 16 from the optical fiber preform 15 and winding of the optical fiber 17 having the coating layer formed therearound are possible is thus reached, and starting of the optical fiber manufacturing apparatus 1 is thus completed.

In this winding preparation process, based on control by the control unit 12, the measuring device 7 measures the outer diameter and passage position of the glass optical fiber 16 that has been drawn, by transmitting and receiving the light L1 between the light source unit 7a and the light receiving unit 7b. The control unit 12 controls the drawing speed by controlling the drive unit 3b of the pulling mechanism 3 such that the outer diameter measured by the measuring device 7 reaches a target value for the glass optical fiber 16, and controls relative position of the optical fiber preform 15 to the drawing furnace 2 by controlling the holding mechanism 8.

Figure 5:
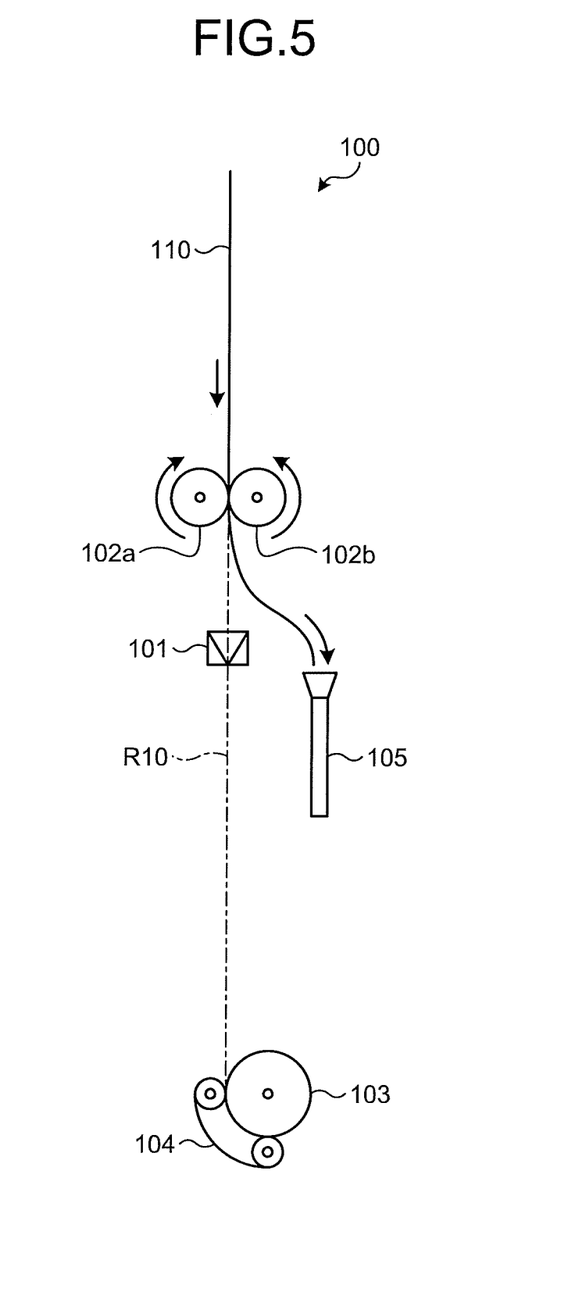
FIG. 5 is a diagram for explanation of a comparative example of a method of starting manufacture of an optical fiber.

FIG. 5 is a diagram illustrating a comparative example of a start-up method of optical fiber manufacturing. As illustrated in FIG. 5, for example, in an optical fiber manufacturing apparatus 100 of this comparative example, a die 101 is fixedly arranged at a predetermined position on an optical fiber passage route R10. Furthermore, a pair of small-sized capstans 102a and 102b for pre-drawing for thinning of a glass optical fiber 110 is arranged above the die 101, and a capstan 103 and a freely rotatable endless belt 104 for drawing a glass optical fiber to be coated from an optical fiber preform are arranged below the die 101. The small-sized capstans 102a and 102b are generally smaller than the capstan 103, and are oppositely arranged with the optical fiber passage route R10 interposed therebetween. Moreover, a suction device 105 that sucks the glass optical fiber 110 that has not been completely adjusted to be made thinner in outer diameter is arranged at a position below the small-sized capstans 102a and 102b and away sideways from the optical fiber passage route R10.

When manufacture of an optical fiber is started generally, for example, when the optical fiber manufacturing apparatus 100 illustrated in FIG. 5 is started; the small-sized capstans 102a and 102b pre-draw and serially send out the glass optical fiber 110 downward from the optical fiber preform (not illustrated in the drawings) thereabove while sandwiching the glass optical fiber 110 therebetween in a radial direction, and make the glass optical fiber 110 thinner. Until the outer diameter of the glass optical fiber 110 has been adjusted to a dimension smaller than the diameter of the insertion hole of the die 101 by the pre-drawing, the glass optical fiber 110 travels by bending away sideways from the optical fiber passage route R10 leading to the die 101 at a lower side, and is thereafter serially sucked by the suction device 105. After the outer diameter of the glass optical fiber 110 has been adjusted to a dimension smaller than that of the insertion hole of the die 101, the small-sized capstans 102a and 102b end the pre-drawing of the glass optical fiber 110. The glass optical fiber 110 is cut at a portion between the suction device 105 and the small-sized capstans 102a and 102b, and is inserted into the insertion hole of the die 101 from its cut end portion leading to the optical fiber preform. Thereafter, the glass optical fiber 110 reaches the position of the lower capstan 103, with, for example, a weight attached to the cut end portion thereof, and is wound around the capstan 103 in a state of being sandwiched between the capstan 103 and the endless belt 104. The small-sized capstans 102a and 102b are adjusted to be in a state of being separated from the glass optical fiber 110 before drawing of the glass optical fiber 110 is performed.

The starting of the optical fiber manufacturing apparatus 100 is thus completed. Thereafter, the glass optical fiber 110 is drawn from the optical fiber preform by pulling action of the capstan 103 and endless belt 104. A resin is serially applied around the drawn glass optical fiber 110 by the die 101 while the drawn glass optical fiber 110 travels along the optical fiber passage route R10.

However, in the above described starting of the manufacture of the optical fiber, the glass optical fiber pre-drawn from the optical fiber preform is easily broken by, for example, being bent above the die, and thus breakage scraps, such as fragments of the glass optical fiber or glass scraps, may be generated and remain around the die. In particular, because the glass optical fiber immediately after start of the pre-drawing is large in outer diameter, the glass optical fiber is difficult to be curved and easy to be broken, and is thus difficult to be put into the suction device 105. In this case, the glass optical fiber (the glass optical fiber to be coated) travelling through the insertion hole of the die may be damaged by coming into contact with the breakage scraps, and this damage causes strength of the glass optical fiber to be insufficient. Furthermore, the breakage scraps may be mixed into the resin to be applied around the glass optical fiber, and this mixing may reduce reliability of the coating layer of the bare optical fiber.

As described above, according to the embodiment of the present disclosure, a die serving as a coating mechanism arranged between a drawing furnace thereabove and a pulling mechanism therebelow is retracted from a passage route of a glass optical fiber between the drawing furnace thereabove and the pulling mechanism therebelow, before the outer diameter of the glass optical fiber is adjusted by pre-drawing; the outer diameter of the glass optical fiber is thereafter adjusted by pre-drawing of the glass optical fiber by means of the pulling mechanism at the lower side from an optical fiber preform melted by heating by means of the drawing furnace at the upper side; the die that has been retracted is returned onto the passage route of the glass optical fiber that has been adjusted in outer diameter, after the adjustment of the outer diameter of the glass optical fiber by pre-drawing is ended; and the position of the passage route of the glass optical fiber that has been adjusted in outer diameter and the position of the insertion hole of the die are aligned with each other.

Accordingly, there is no need for the glass optical fiber pre-drawn from the optical fiber preform (in particular, a glass optical fiber not sufficiently pre-drawn and having a large outer diameter (for example, an outer diameter of about 1-2 m)) to be bent outward from the passage route thereby to circumvent the die; the glass optical fiber is able to be pre-drawn linearly between the drawing furnace at an upper side and the pulling mechanism at a lower side and be adjusted to be thinned to a desired outer diameter (for example, to 0.2 mm or less); and the adjustment of the outer diameter by pre-drawing of the glass optical fiber is able to be performed in a state where the die is not present in the direction of the pre-drawing (lower direction) of the glass optical fiber from the optical fiber preform. The glass optical fiber to be adjusted in outer diameter thereby becomes difficult to be broken when being pre-drawn, and breakage scraps of the glass optical fiber are able to be prevented from being generated (in particular, being generated above the die). As a result, when the coating resin is applied on the outer circumference of the optical fiber by the die, the cases are prevented where strength of the glass optical fiber to be coated becomes insufficient due to flaws caused by contact of breakage scraps with the glass optical fiber to be coated, and where reliability of the coating layer on the outer circumference of the glass optical fiber becomes reduced due to mixing of the breakage scraps into the coating resin for the glass optical fiber.

Furthermore, because the pulling mechanism that draws the glass optical fiber that has been adjusted in outer diameter from the optical fiber preform melted by heating is also used for the above described pre-drawing of the glass optical fiber, a dedicated device (for example, the pair of small-sized capstans 102a and 102b illustrated in FIG. 5) for pre-drawing of the glass optical fiber does not need to be installed. As a result, the scale and configuration of the optical fiber manufacturing apparatus are able to be simplified, and the labor and running cost involved in maintenance of the apparatus are able to be reduced.

Furthermore, according to the embodiment of the present disclosure, the passage position of the glass optical fiber that has been adjusted in outer diameter is measured, and based on the measured passage position of the glass optical fiber, the return position of the die is controlled. Therefore, when the die is returned onto the passage route of the glass optical fiber that has been adjusted in outer diameter, the position of the passage route of the glass optical fiber and the position of the insertion hole of the die are able to be made to coincide with each other highly accurately.

In the above described embodiment, although the optical fiber manufacturing apparatus where the WOW method has been applied as a method of coating on the outer circumference of the glass optical fiber has been described as an example, the present disclosure is not limited to this example. Device configurations of a coating mechanism and a curing mechanism with the WOW method may be applied to an optical fiber manufacturing apparatus according to the present disclosure, or device configurations of a coating mechanism and a curing mechanism with the WOD method may be applied to an optical fiber manufacturing apparatus according to the present disclosure. Furthermore, the die serving as the coating mechanism may be of an integrated type, or may be of a split type (for example, a two-split type) that is splittable into plural dies. Moreover, the die may be a die that applies only a single layer or a die that applies two layers at once.

Furthermore, according to the above described embodiment, the glass optical fiber that has been adjusted in outer diameter is cut into an upper glass optical fiber and a lower glass optical fiber, and the upper glass optical fiber has been inserted into the insertion hole of the die. Then, a cut end portion of the upper glass optical fiber and a cut end portion of the lower glass optical fiber are joined together into a string of the glass optical fiber by a joining member between the optical fiber preform in the drawing furnace at the upper side and the pulling mechanism at the lower side. However, the present disclosure is not limited to this example. For example, after the upper glass optical fiber has been inserted into the insertion hole of the die, a weight may be attached to the cut end portion of the upper glass optical fiber, the cut end portion may be lowered to the position of the pulling mechanism while the glass optical fiber is drawn out from the optical fiber preform by the weight, and the upper glass optical fiber may thereafter be wound around the pulling mechanism (for example, a capstan).

Furthermore, according to the above described embodiment, in the stopping process of Step S105, the travel of the glass optical fiber that has been adjusted in outer diameter is stopped, and thereafter in the position measuring process of Step S106, the passage position of the glass optical fiber being stopped is measured. However, the present disclosure is not limited to this example. The passage position of the glass optical fiber that has been adjusted in outer diameter may be measured, together with the outer diameter of the glass optical fiber. For example, the outer diameter and passage position of the glass optical fiber being pre-drawn may be measured at Step S103 illustrated in FIG. 2, and the passage position measured together with the outer diameter determined to be less than the reference value at Step S104 may be used as the passage position of the glass optical fiber that has been adjusted in outer diameter.

Furthermore, according to the above described embodiment, in the cutting process of Step S107, the glass optical fiber that has been adjusted in outer diameter is cut at a portion lower than the die. However, the present disclosure is not limited to this example. In the cutting process of Step S107, the glass optical fiber that has been adjusted in outer diameter may be cut at a portion above the die, or may be cut at a portion at the same height position as the die. In any of these cases, if the upper glass optical fiber that has been cut is unable to, as is, reach the insertion hole of the die that has been returned, the glass optical fiber may be drawn out further from the optical fiber preform 15 by its own weight or the like.

Furthermore, according to the above described embodiment, after the glass optical fiber has been cut, the relative position of the optical fiber preform to the drawing furnace is adjusted and the optical fiber preform is separated from the heater of the drawing furnace. However, the present disclosure is not limited to this example. The adjustment of the relative position of the optical fiber preform to the drawing furnace for separation of the optical fiber preform from the heater of the drawing furnace may be performed: after the stopping process of Step S105; after the position measuring process of Step S106; or after the cutting process of Step S107. That is, the adjustment of the relative position of the optical fiber preform to the drawing furnace may be performed after the draw-out (pre-drawing) of the glass optical fiber by the pulling mechanism has been stopped.

Furthermore, according to the above described embodiment, operation of a transport mechanism that returnably retracts the die and driving of the pulling mechanism are controlled by a control unit. However, the present disclosure is not limited to this example. For example, the die retracting operation and the die returning operation by the transport mechanism may be performed by manual operation, or the driving of the pulling mechanism (rotation of the capstan) may be started or stopped by manual operation. Moreover, in the die returning operation by the transport mechanism, the return position of the die may be determined by restriction of the movable range of the drive shaft of the transport mechanism.

Furthermore, the present disclosure is not limited by the above described embodiment. Any configuration formed of a combination of the above described components as appropriate is included in the present disclosure. In addition, any other embodiments, examples, operation techniques, and the like that are made by those skilled in the art or the like based on the above described embodiment are all included in the scope of the present disclosure.

According to the present disclosure, an effect of enabling reduction of generation of breakage scraps of glass optical fibers is achieved.

As described above, an optical fiber manufacturing apparatus and a method of starting the optical fiber manufacturing apparatus, according to the present disclosure, are useful for adjustment of the outer diameter of a glass optical fiber, and is particularly suitable for an optical fiber manufacturing apparatus and a method of starting the optical fiber manufacturing apparatus, which enable reduction of generation of breakage scraps of glass optical fibers.

What is claimed is:
1. An optical fiber manufacturing apparatus, comprising:
   a heating furnace configured to thermally melt an optical fiber preform;
   a pulling mechanism configured to adjust an outer diameter of a glass optical fiber by drawing out the glass optical fiber from the optical fiber preform melted through heating by the heating furnace, and to draw the glass optical fiber that has been adjusted in outer diameter;

a coating mechanism configured to apply a predetermined resin on an outer circumference of the glass optical fiber that has been adjusted in outer diameter; and a transport mechanism configured to returnably retract the coating mechanism from a passage route of the glass optical fiber.

2. The optical fiber manufacturing apparatus according to claim 1, further comprising a measuring device configured to measure the outer diameter of the glass optical fiber between the heating furnace and the coating mechanism.

3. The optical fiber manufacturing apparatus according to claim 2, further comprising a hardware processor configured to control the pulling mechanism, based on the outer diameter of the glass optical fiber measured by the measuring device.

4. The optical fiber manufacturing apparatus according to claim 3, wherein
the measuring device further measures a passage position of the glass optical fiber that has been adjusted in outer diameter, and
a control unit controls a return position of the coating mechanism, based on the measured passage position of the glass optical fiber that has been adjusted in outer diameter.

5. The optical fiber manufacturing apparatus according to claim 3, comprising:
a holding mechanism for holding the optical fiber preform and adjusting a relative position of the optical fiber preform to the heating furnace, wherein
a control unit controls the holding mechanism to separate the optical fiber preform from a heater of the heating furnace, after stopping the draw-out of the glass optical fiber.

6. The optical fiber manufacturing apparatus according to claim 1, wherein the pulling mechanism includes a capstan configured to allow the glass optical fiber that has been adjusted in outer diameter to be wound therearound.

7. The optical fiber manufacturing apparatus according to claim 1, wherein the coating mechanism includes a die having a through hole that allows the glass optical fiber that has been adjusted in outer diameter to pass therethrough.

8. The optical fiber manufacturing apparatus according to claim 1, wherein the transport mechanism includes
a support configured to support the coating mechanism, and
a driver configured to pneumatically, hydraulically, or electrically move the supported coating mechanism closer to or away from a passage route of the glass optical fiber.

9. The optical fiber manufacturing apparatus according to claim 2, wherein the measuring device includes a light source and a light detector that are arranged to allow a passage route of the glass optical fiber to be interposed therebetween.

10. A start-up method for an optical fiber manufacturing apparatus, which is to thermally melt an optical fiber preform by a heating furnace; draw, by a pulling mechanism, a glass optical fiber having a desired outer diameter from the optical fiber preform; apply, by a coating mechanism, a predetermined resin on an outer circumference of the glass optical fiber that has been drawn; and manufacture the optical fiber having a coating layer formed on the outer circumference by curing of the predetermined resin, the method comprising:
retracting, by the pulling mechanism, the coating mechanism from a passage route of the glass optical fiber drawn out from the optical fiber preform;
drawing out, by the pulling mechanism, the glass optical fiber from the optical fiber preform such that an outer diameter of the glass optical fiber is adjusted; and
returning the coating mechanism onto a passage route of the glass optical fiber that has been adjusted in outer diameter.

11. The start-up method for the optical fiber manufacturing apparatus, according to claim 10, the method further comprising:
measuring the outer diameter of the glass optical fiber adjusted by the pulling mechanism;
stopping the draw-out of the glass optical fiber by the pulling mechanism, if the measured outer diameter of the glass optical fiber is less than a diameter of an insertion hole of the coating mechanism; and
cutting the glass optical fiber that has been stopped from being drawn out and has been adjusted in outer diameter, wherein
when returning the coating mechanism, the coating mechanism is returned onto the passage route of the glass optical fiber that has been adjusted in outer diameter, after the glass optical fiber that has been adjusted in outer diameter is cut.

12. The start-up method for the optical fiber manufacturing apparatus, according to claim 11, the method further comprising:
measuring a passage position of the glass optical fiber that has been adjusted in outer diameter by the pulling mechanism, wherein
when returning the coating mechanism, a return position of the coating mechanism is controlled, based on the measured passage position of the glass optical fiber that has been adjusted in outer diameter.

13. The start-up method for the optical fiber manufacturing apparatus according to claim 12, wherein a relative position of the optical fiber preform to the heating furnace is adjusted such that the optical fiber preform is separated from a heater of the heating furnace after the draw-out of the glass optical fiber has been stopped.

14. The start-up method for the optical fiber manufacturing apparatus according to claim 11, wherein a relative position of the optical fiber preform to the heating furnace is adjusted such that the optical fiber preform is separated from a heater of the heating furnace after the draw-out of the glass optical fiber has been stopped.

15. The start-up method for the optical fiber manufacturing apparatus, according to claim 10, the method further comprising:
measuring a passage position of the glass optical fiber that has been adjusted in outer diameter by the pulling mechanism, wherein
when returning the coating mechanism, a return position of the coating mechanism is controlled, based on the measured passage position of the glass optical fiber that has been adjusted in outer diameter.

* * * * *